US011193645B1

(12) United States Patent
He

(10) Patent No.: US 11,193,645 B1
(45) Date of Patent: Dec. 7, 2021

(54) METHOD AND DEVICE FOR DYNAMIC ADAPTIVE HEADLAMP SYSTEM FOR VEHICLES

(71) Applicant: Arex Industries, Inc., Irwindale, CA (US)

(72) Inventor: Mizeng He, TaiZhou (CN)

( * ) Notice: Subject to any disclaimer, the term of this patent is extended or adjusted under 35 U.S.C. 154(b) by 0 days.

(21) Appl. No.: 17/326,104

(22) Filed: May 20, 2021

(30) Foreign Application Priority Data

Aug. 10, 2020 (CN) ........................ 202010793189.X

(51) Int. Cl.

| | |
|---|---|
| ***B60Q 1/00*** | (2006.01) |
| ***F21S 41/692*** | (2018.01) |
| ***F21S 41/43*** | (2018.01) |
| ***F21S 41/47*** | (2018.01) |
| ***F21S 45/47*** | (2018.01) |
| ***F21S 45/43*** | (2018.01) |
| ***F21S 41/25*** | (2018.01) |
| *F21Y 115/10* | (2016.01) |
| *F21W 102/13* | (2018.01) |

(52) U.S. Cl.
CPC ............ *F21S 41/692* (2018.01); *F21S 41/25* (2018.01); *F21S 41/43* (2018.01); *F21S 41/47* (2018.01); *F21S 45/43* (2018.01); *F21S 45/47* (2018.01); *F21W 2102/13* (2018.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2009/0086500 A1* | 4/2009 | Tatara | .................... | B60Q 1/076 362/512 |
| 2013/0335974 A1* | 12/2013 | Yen | ......................... | F21V 13/14 362/284 |
| 2016/0040848 A1* | 2/2016 | Tsukamoto | ............. | F21S 41/68 362/509 |
| 2018/0281671 A1* | 10/2018 | Na | ........................ | F21S 41/645 |
| 2019/0234580 A1* | 8/2019 | Wang | .................... | F21S 41/285 |
| 2020/0189447 A1* | 6/2020 | Hsu | ....................... | F21S 41/692 |

* cited by examiner

*Primary Examiner* — Elmito Breval
(74) *Attorney, Agent, or Firm* — Theodore S. Lee, Esq.

(57) ABSTRACT

An apparatus for adjusting high and low beams of an automobile headlamp comprising: a lens and a cooling support frame; wherein a parabolic reflector and a LED light assembly are set in the cooling support frame; wherein an opening is set on one side of the lens and an adjusting mechanism for adjusting high and low beams wherein the adjusting mechanism is set in the opening; wherein the adjusting is further comprising a fixed plate wherein the fixed plate is set on the cooling support frame near adjacent to the opening; wherein a solenoid valve is installed on the fixed plate; wherein a plurality of connecting pieces are set on both sides of the fixed plate; wherein an adjusting plate is movably connected between the connecting pieces through a clamp spring; wherein a cross rod is set on the adjusting plate; wherein a valve rod of the solenoid valve is connected to the cross rod such that the adjusting plate moves from position A to position B when the valve rod moves wherein the adjusting plate in position a interferes with light transmission between the LED light assembly and the lens; wherein the adjusting plate in position B does not interfere with light transmission between the LED light assembly and the lens.

6 Claims, 5 Drawing Sheets

METHOD AND DEVICE FOR DYNAMIC ADAPTIVE HEADLAMP SYSTEM FOR VEHICLES

CROSS-REFERENCE TO RELATED APPLICATION

The present application claims priority to Chinese Patent Application No. 202010793189.X, filed on Aug. 10, 2020, the entire content of which is incorporated herein for all purposes by this reference.

FIELD OF THE INVENTION

The present invention is directed generally to a method and device providing for dynamic adaptive lighting control for vehicle headlamps.

BACKGROUND OF THE INVENTION

Modern headlamps are electrically operated and are generally positioned in pairs, located on the front of the vehicle with one or two on each side. A headlamp system is required to produce a low and a high beam. High beams cast their lights straight ahead thereby maximizing the seeing distance for the driver; however, high beams produce too much glare for safe use when there are other vehicles on the road and they also causes backdazzle from rain, snow, and fog as a result of refraction of the water droplets. In contrast, low beams direct most of their light downward and to the side as to provide some forward and lateral illumination without the backdazzle of high beams.

As such, at night time, a vehicle driver may use low beams to prevent drivers of oncoming vehicles as well as drivers of vehicles in the front from being dazzled, while switching to high beams for improved range and illumination when there are no oncoming vehicles or visible vehicles in front. However, this approach to solving the problem has the significant drawback of requiring the driver to be constantly alert and manually switching between high beams and low beams as necessary. A driver of the vehicle can inadvertently drive with the high beams if they fail to see other vehicles or fail to timely switch to low beams.

Fortunately, the widespread availability of sensor technologies for driver assist autonomous operations have provided for active control of vehicles headlamp with dynamic adaptive illumination. Instead of relying on driver to manually control the illumination of the headlamp, headlamp can be automatically adjusted based on inputs from the vehicle and its surroundings. For example, other vehicles on the road can be detected and identified and the headlamp can automatically adjust to dim or redirect the headlight to limit or reduce glare.

At present, the LED lens module of a modern automobile headlamp is generally composed of the lens, lens hood, support frame, parabolic reflector, LED chip, and heat sink. The lens and lens hood are manufactured separately, thus the manufacturing cost of the molds are increased because a mold needs be developed for each component. Additionally, the assembly process is troublesome and the uniformity of mirror installation is difficult to achieve. Faulty assembly could cause the position of the illumination to be shifted and result in the reflected light to be scattered or light leakage. Therefore, applicant has developed a lens module with rectangular lens that has improved light gathering effects and clearer illumination, and applicant has applied for a patent entitled "LED lens module for automobile headlamp with integrated light distribution lens", with Chinese patent No. 201821412337.3. The headlamp with the lens module with the rectangular lens requires a mechanism for automatically adjusting between high and low beams. However, because the lens is fixed to the heat sink through the support frame, the automatic mechanism for dynamically adjusting between high and low beams is very complicated and cannot be accomplished with existing methods.

In view of the shortcomings of the prior art, the technical problem to be solved by the present disclosure is to provide an automatic mechanism for adjusting high and low beams of rectangular LED lens module of headlamp for vehicles.

OBJECT OF THE INVENTION

Accordingly, it is an object of this invention to provide an innovative method and device for dynamic adaptive headlamp system.

It is another object of the invention to provide an innovative method and device for an automatic mechanism for adjusting between high beams and low beams.

It is another object of the invention to provide an innovative method and device for a dynamic adaptive headlamp system with a lens module with rectangular lens.

It is another object of the invention to provide an innovative method and device for a dynamic adaptive headlamp system with a lens that is fixed to the heat sink through the support frame.

It is another object of the invention to provide an innovative method and device for a dynamic adaptive headlamp system that has a compact structural arrangement.

It is another object of the invention to provide an innovative method and device for a dynamic adaptive headlamp that can be manufactured efficiently and effectively.

It is another object of the invention to provide an innovative method and device for a dynamic adaptive headlamp that can be assembled efficiently and effectively.

SUMMARY OF INVENTION

The invention disclosed herein provides for an innovative method and device for a dynamic adaptive headlamp with an automatic mechanism for adjusting high and low beams of a rectangular LED lens module of automobile headlamps. Specifically, with the lens directly fixed on the heat sink, the headlamp adopts a solenoid valve to drive the automatic adjustment of the high and low beams.

What is disclosed is an apparatus for adjusting high and low beams of an automobile headlamp comprising: a lens and a cooling support frame; wherein a parabolic reflector and a LED light assembly are set in the cooling support frame; wherein an opening is set on one side of the lens and an adjusting mechanism for adjusting high and low beams wherein the adjusting mechanism is set in the opening; wherein the adjusting is further comprising a fixed plate wherein the fixed plate is set on the cooling support frame near adjacent to the opening; wherein a solenoid valve is installed on the fixed plate; wherein a plurality of connecting pieces are set on both sides of the fixed plate; wherein an adjusting plate is movably connected between the connecting pieces through a clamp spring; wherein a cross rod is set on the adjusting plate; wherein a valve rod of the solenoid valve is connected to the cross rod such that the adjusting plate moves from position a to position b when the valve rod moves wherein the adjusting plate in position a interferes with light transmission between the LED light assembly and the lens; wherein the adjusting plate in position b does not interfere with light transmission between the LED light assembly and the lens.

In one embodiment, the connecting clamp is set on the valve rod and the connecting clamp clamps the cross rod. In another embodiment, a folding plate and a fixed hole column are set on the cooling support frame; wherein a positioning rod is set on the folding plate; wherein a positioning hole is set on the fixed plate wherein the positioning rod is matched with the positioning hole; wherein the fixed hole is set on the fixed plate; wherein the fixed hole and the fixed hole column are fixed by screws. In yet another embodiment, a plurality of connecting hole columns are set on the four corners of the upper top surface of the cooling support frame wherein a plurality of integrated connecting hole seats are set on the four corners of the lower bottom surface of the lens wherein the connecting hole columns and the connecting hole seat are fixed by screws. In yet another embodiment, a plurality of cooling rods are evenly distributed on both sides of the cooling support frame. In yet another embodiment, a cooling fan is set at the bottom of the cooling support frame.

BRIEF DESCRIPTION OF THE DRAWINGS

These and other features and advantages of the invention will not be described with reference to the drawings of certain preferred embodiments, which are intended to illustrate and not to limit the invention, and in which.

DETAILED DESCRIPTION OF THE INVENTION

Some embodiments are described in detail with reference to the related drawings. Additional embodiments, features, and/or advantages will become apparent from the ensuing description or may be learned by practicing the invention. The following description is not to be taken in a limiting sense, but is made merely for the purpose of describing the general principles of the invention. The steps described herein for performing methods form one embodiment of the invention, and, unless otherwise indicated, not all of the steps must necessarily be performed to practice the invention, nor must the steps necessarily be performed in the order listed. It should be noted that references to "an" or "one" or "some" embodiment(s) in this disclosure are not necessarily to the same embodiment, and such references mean at least one.

Figure 1:
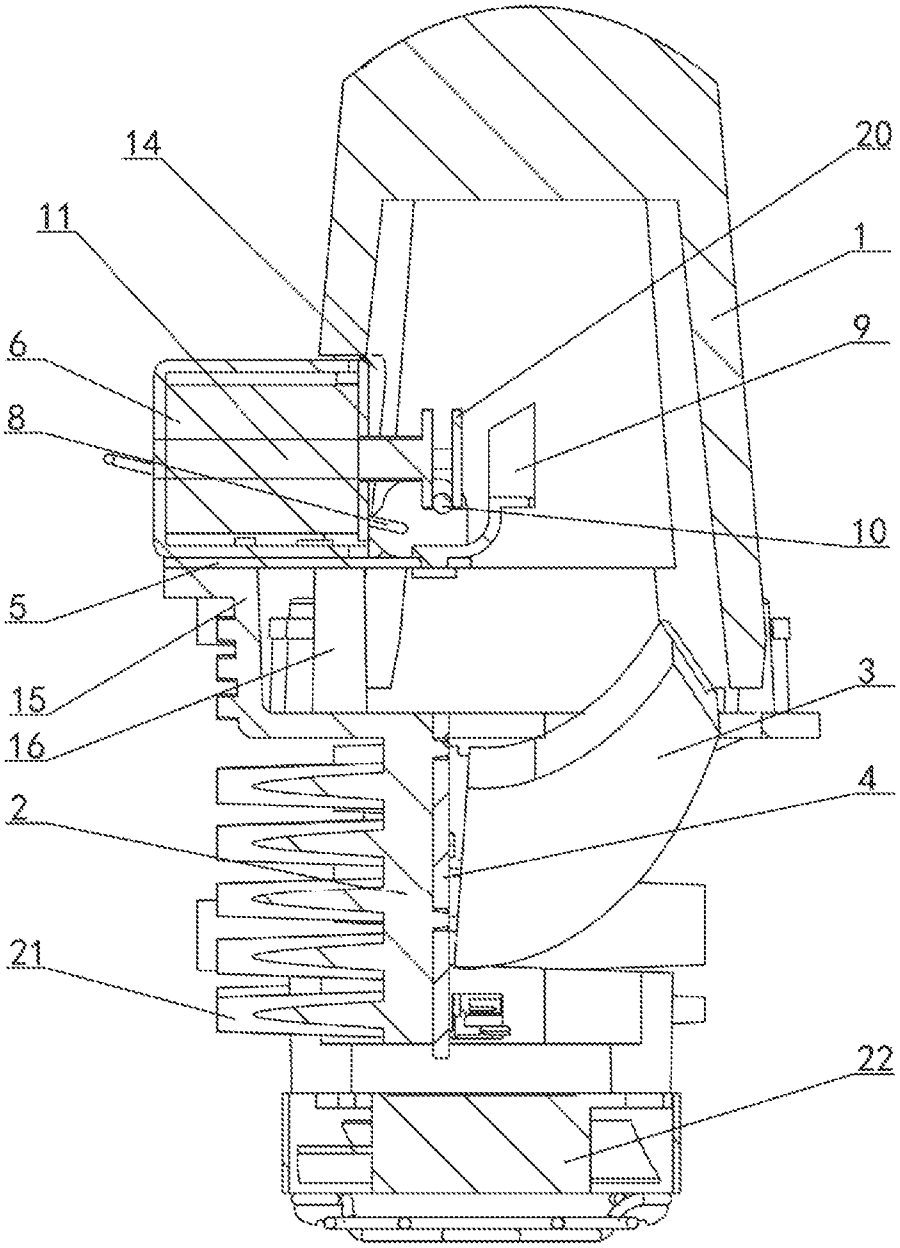
FIG. 1 illustrates an embodiment of the current invention showing the structural schematics of the automatic mechanism for adjusting high and low beams.

FIG. 1 illustrates an embodiment of the current invention's automatic mechanism for adjusting high and low beams of rectangular LED lens module for automobile headlamp. The embodiment comprises of a rectangular lens 1 and a cooling support frame 2, wherein a parabolic reflector 3 and an LED headlamp assembly 4 are set in the cooling support frame 2. The automatic mechanism for adjusting high and low beams includes a fixed plate 5 that is set on the cooling support frame 2 at the opening 14, wherein a solenoid valve 6 is installed on the fixed plate 5. A cooling rod 21 is evenly distributed on both sides of the cooling support frame 2, which provides cooling, and a cooling fan 22 is set at the bottom of the cooling support frame 2, which can further improve the cooling performance.

An opening 14 is set on one side of the rectangular lens 1 and an automatic mechanism for adjusting high and low beams is set in the opening 14. The folding plate 15 and a fixed hole column 16 are set on the cooling support frame 2. A clamp 20 on the valve rod 11 clamps the cross rod 10. The use of clamp 20 allows for the ease of assembly and disassembly as needed.

The solenoid valve 6 causes the valve rod 11 to drive the cross rod 10, and the cross rod 10 drives the adjusting place 9 to rotate through the clamp spring 8. The rotation of the clamp spring 8 in turn adjusts the position of the adjusting plate 9. When the adjusting plate 9 blocks the straight light from the light source, the automobile headlamp flashes high beams, when the adjusting plate 9 fails to block the straight light from the light source, the automobile headlamp flashes low beams.

Figure 2:
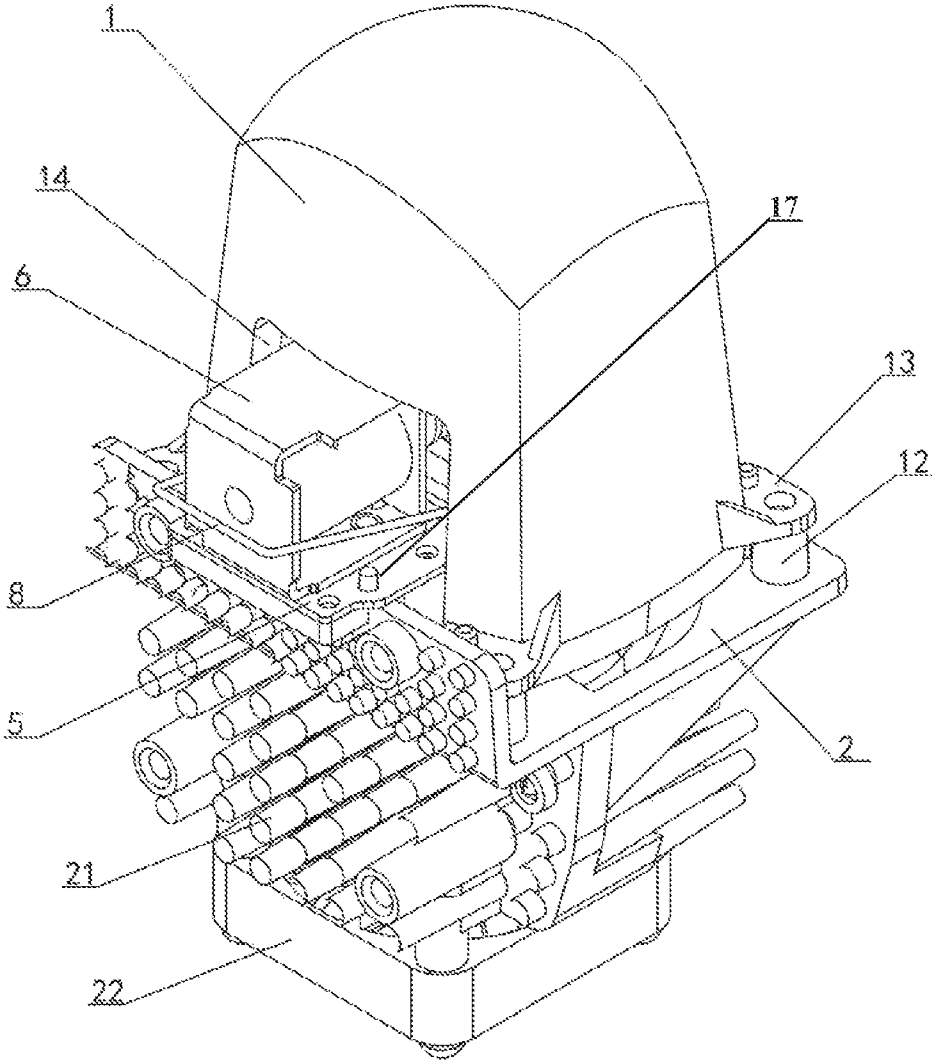
FIG. 2 illustrates an embodiment of the current invention showing a schematic diagram of the automatic mechanism for adjusting high and low beams.

FIG. 2 illustrates the perspective view of the schematic diagram of the automatic mechanism for adjusting high and low beams of rectangular LED lens module for automobile headlamp. Similar to FIG. 1, a clamp 20 on the valve rod 11 clamps the cross rod 10. The use of clamp 20 allows for the ease of assembly and disassembly as needed. The folding plate 15 and a fixed hole column 16 are set on the cooling support frame 2. The positioning rod 17 is set on the folding plate 15, and a positioning hole 18 is set on the fixed plate 5. The positioning rod 17 is matched with the positioning hole 18, and a fixed hole 19 is set on the fixed plate. The fixed hole 19 and the fixed hole column 16 are fixed by screws, which features convenient and reliable installation.

Further, a connecting hole column 12 is set on the four corners of the upper top surface of the cooling support frame 2, and an integrated connecting hole seat 13 is set on the four corners of the lower bottom surface of the rectangular lens 1. The connecting hole column 12 and the connecting hole seat 13 are fixed by screws, and the rectangular lens is directly fixed on the cooling support frame without using any other support frames, which reduces the components, simplifies the structure and saves the cost. The cooling rod 21 is evenly distributed on both sides of the cooling support frame 2 and a cooling fan 22 is set at the bottom of the cooling support frame 2, thereby providing improve cooling performance.

Figure 3:
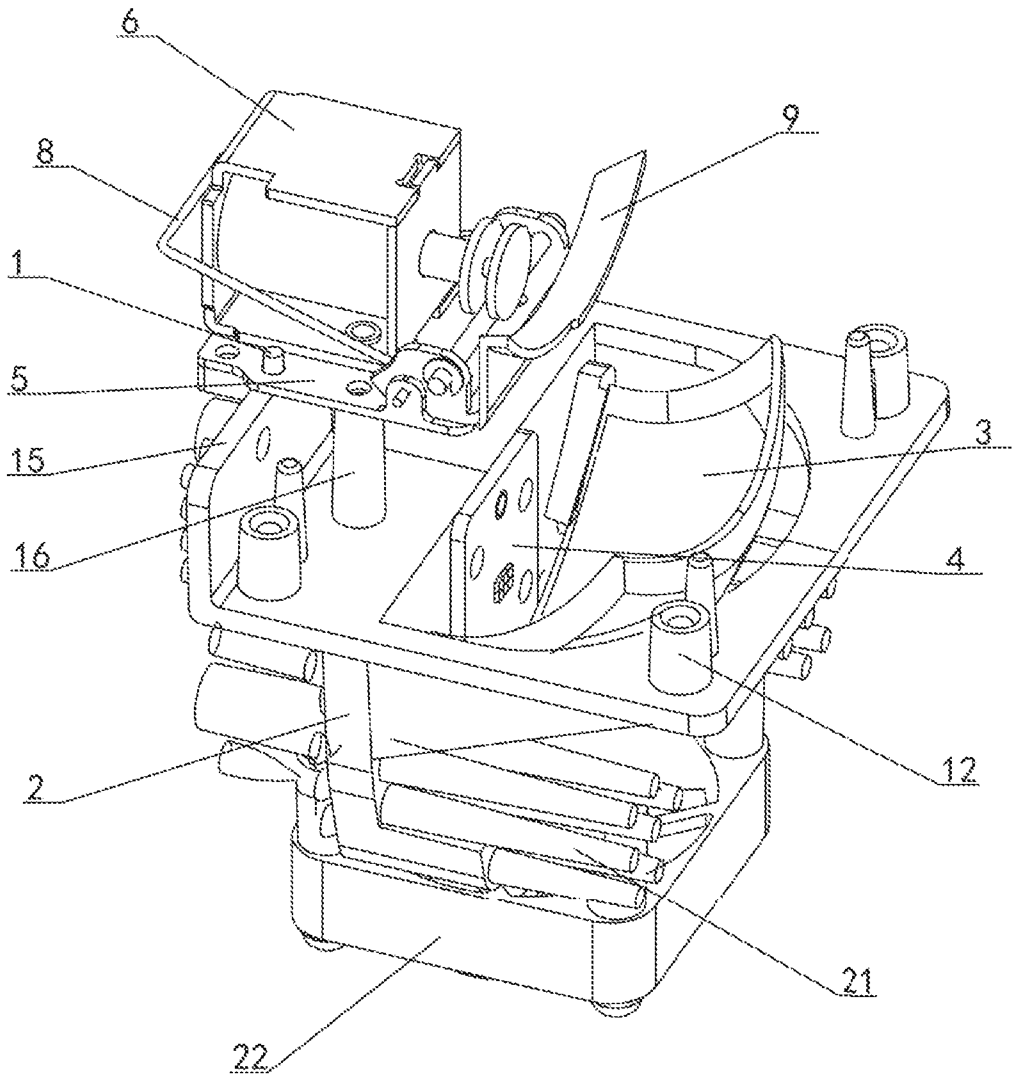
FIG. 3 illustrates an embodiment of the current invention showing a schematic diagram of a low beam state of the automatic mechanism for adjusting high and low beams.

FIG. 3 illustrates an embodiment of the current invention showing a schematic diagram of a low beam state of the automatic mechanism for adjusting high and low beams. In particular, an opening 14 is set on one side of the rectangular lens 1 and a solenoid valve 6 and an adjusting plate 9. In the case of low beam, the solenoid valve 6 is powered off, the adjusting plate 9 is automatically reset under the action of the clamp spring 8. The adjusting plate 9 blocks part of the straight light from the light source, and the automobile headlamp flashes low beams.

Figure 4:
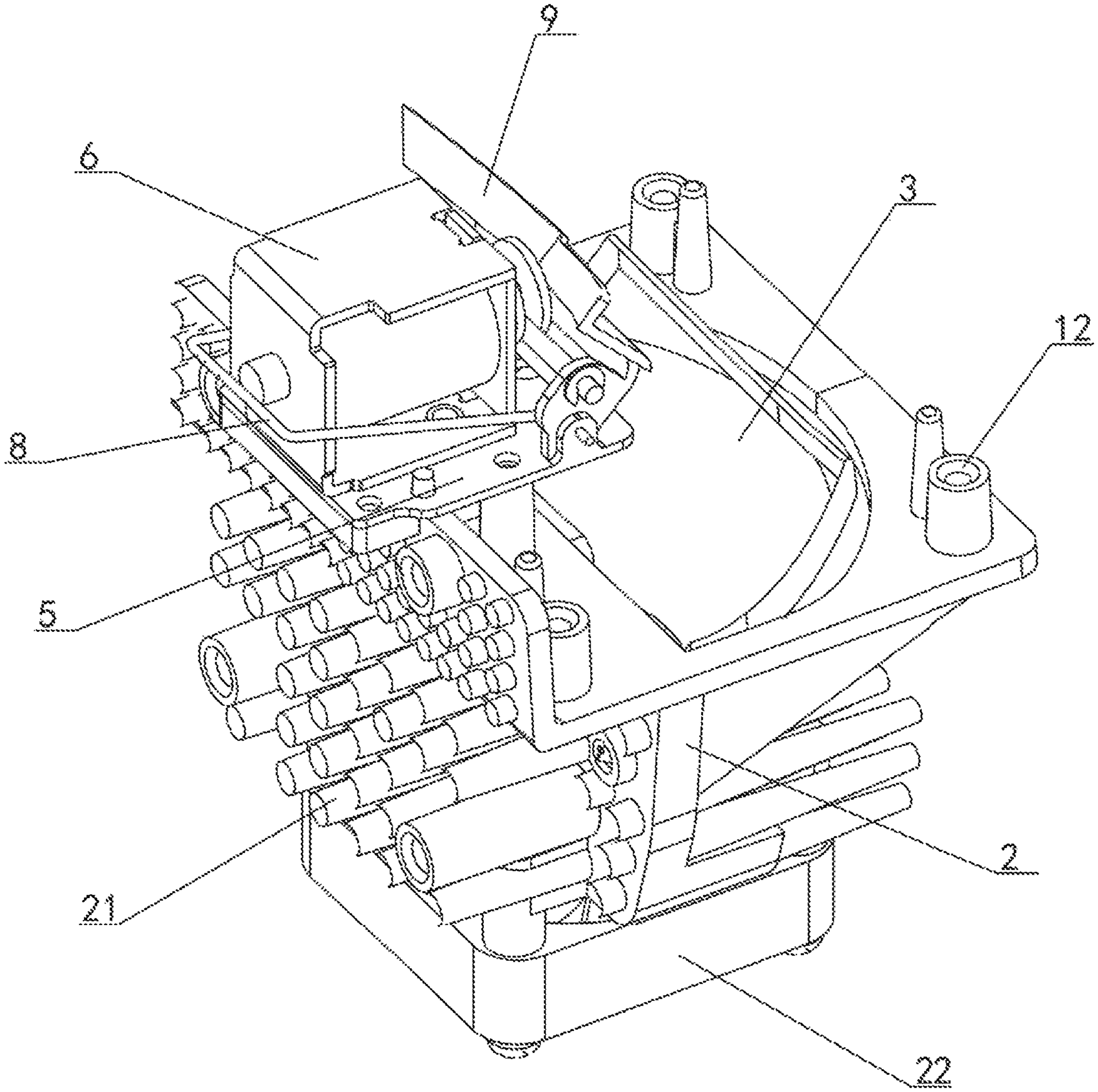
FIG. 4 illustrates an embodiment of the current invention showing a schematic diagram of a high beam state of the automatic mechanism for adjusting high and low beams.

FIG. 4 illustrates an embodiment of the current invention showing a schematic diagram of a low beam state of the automatic mechanism for adjusting high and low beams. In particular, the solenoid valve 6 is powered, the valve rod 11 drives the cross rod 10, and the cross rod 10 drives the adjusting plate 9 to rotate through the clamp spring 8 to adjust the position of the adjusting plate 9. In other words, the adjusting plate 9 does not block the straight light from the light source, and the automobile headlamp flashes high beams.

Figure 5:
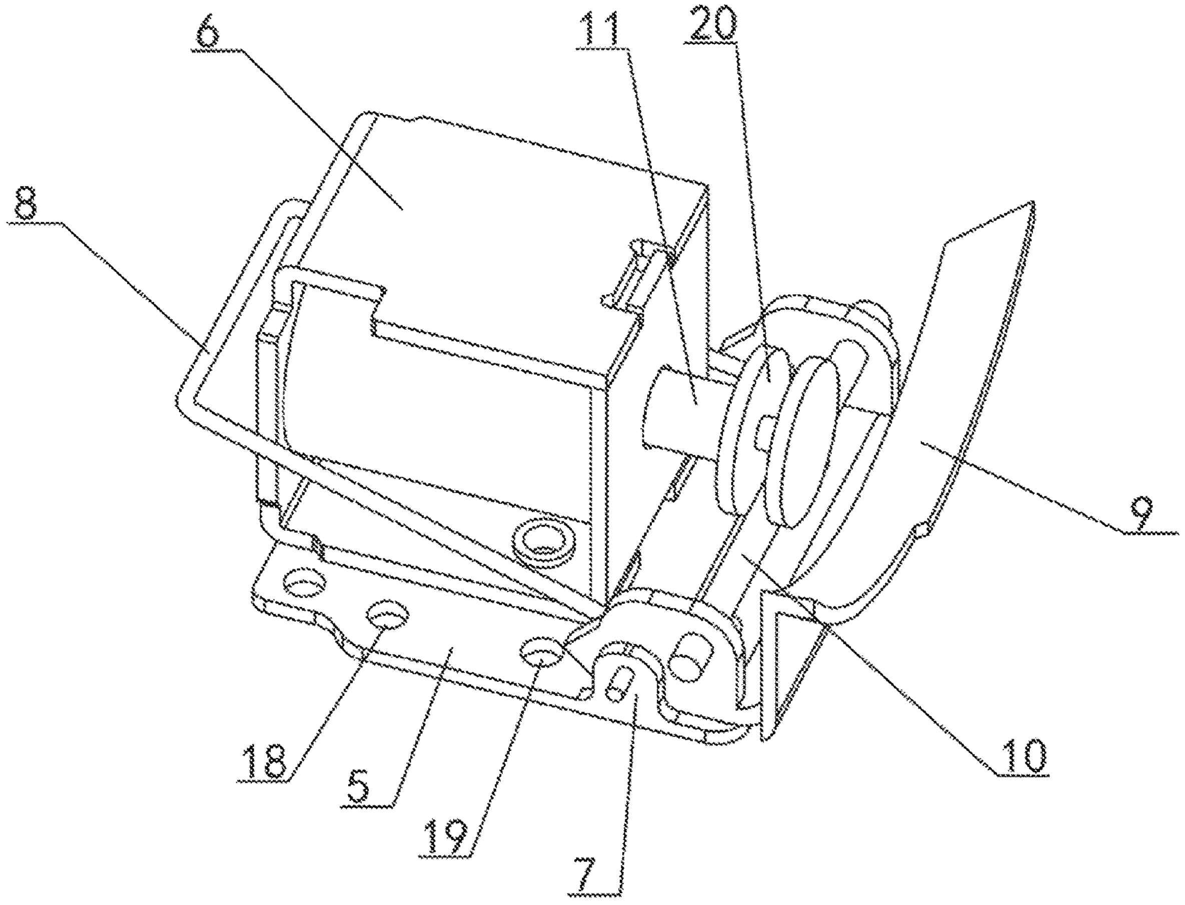
FIG. 5 illustrates an embodiment of the current invention showing the assembly relationship between the solenoid valve and the adjusting plate.

Referring to FIG. 5, which illustrates the assembly relationship between the solenoid valve 6 and the adjusting plate 9, a connecting piece 7 is set on both sides of the front part of the fixed plate 5 and an adjusting plate 9 and the connecting piece 7 movably connect them through a clamp spring 8. A cross rod 10 is set on the adjusting plate 9, and a valve rod 11 of the solenoid valve 6 is connected with the cross rod 10.

The present solution adopts a solenoid valve 6 to directly drive the adjusting plate 9 for adjustment, which is simple and reliable. The present solution overcomes the space limitation of the lens while provides for the automatic adjustment of the high and low beams.

The invention claimed is:

1. An apparatus for adjusting high and low beams of an automobile headlamp comprising: a lens and a cooling support frame; wherein a parabolic reflector and a LED light assembly are set in said cooling support frame; wherein an opening is set on one side of said lens and an adjusting mechanism for adjusting high and low beams wherein said adjusting mechanism is set in said opening; wherein said adjusting is further comprising a fixed plate wherein said fixed plate is set on said cooling support frame near adjacent to said opening; wherein a solenoid valve is installed on said fixed plate; wherein a plurality of connecting pieces are set on both sides of said fixed plate; wherein an adjusting plate is movably connected between said connecting pieces through a clamp spring; wherein a cross rod is set on said adjusting plate; wherein a valve rod of said solenoid valve is connected to said cross rod such that said adjusting plate moves from position A to position B when said valve rod moves wherein said adjusting plate in position a interferes with light transmission between said LED light assembly and said lens; wherein said adjusting plate in position B does not interfere with light transmission between said LED light assembly and said lens.

2. The apparatus of claim 1, wherein a connecting clamp is set on said valve rod and said connecting clamp clamps said cross rod.

3. The apparatus of claim 1, wherein a folding plate and a fixed hole column are set on said cooling support frame; wherein a positioning rod is set on said folding plate; wherein a positioning hole is set on said fixed plate wherein said positioning rod is matched with said positioning hole; wherein said fixed hole is set on said fixed plate; wherein said fixed hole and said fixed hole column are fixed by screws.

4. The apparatus of claim 1, wherein a plurality of connecting hole columns are set on the four corners of the upper top surface of said cooling support frame wherein a plurality of integrated connecting hole seats are set on the four corners of the lower bottom surface of said lens wherein said connecting hole columns and said connecting hole seat are fixed by screws.

5. The apparatus of claim 1, wherein a plurality of cooling rods are evenly distributed on both sides of said cooling support frame.

6. The apparatus of claim 1, wherein a cooling fan is set at the bottom of said cooling support frame.

* * * * *